United States Patent [19]

Dean

[11] Patent Number: 4,923,274

[45] Date of Patent: May 8, 1990

[54] CONNECTOR FOR OPTICAL FIBERS

[75] Inventor: David L. Dean, Hickory, N.C.

[73] Assignee: Siecor Corporation, Hickory, N.C.

[21] Appl. No.: 371,193

[22] Filed: Jun. 26, 1989

[51] Int. Cl.$^5$ .................................................. G02B 6/36
[52] U.S. Cl. .................................................. 350/96.21
[58] Field of Search ........................... 350/96.20, 96.21

[56] References Cited

U.S. PATENT DOCUMENTS

| | | | |
|---|---|---|---|
| 4,252,405 | 2/1981 | Oldham | 350/96.22 |
| 4,616,900 | 10/1986 | Cairns | 350/96.20 |
| 4,717,232 | 1/1988 | Priaroggia | 350/96.20 |

Primary Examiner—William L. Sikes
Assistant Examiner—Akm E. Ullah
Attorney, Agent, or Firm—J. David Abernethy

[57] ABSTRACT

Disclosed herein is a connector for positioning an optical fiber featuring a rotatable locking ring having a cam shaped inner wall having in circumferential succession a first, second, and third inner diameter, the third inner diameter being smaller than the first inner diameter and the second inner diameter being smaller than the third inner diameter, rotation of the locking ring applying inward radial compression to centering elements as the locking ring is rotated from the first to second inner diameter position and to a closed position when the area of the third inner diameter is reached. A plurality of centering members is provided, at least one having no resilient coating thereon, whereby compression forces an optical fiber against resilient material, thereby centering the optical fiber and giving the fiber additional strength to withstand longitudinal tension forces. Also disclosed is an end grommet sized to allow watertight insertion of a buffer tube.

4 Claims, 3 Drawing Sheets

CONNECTOR FOR OPTICAL FIBERS

BACKGROUND OF THE INVENTION

1. The field of the invention is connectors for two optical fibers or one optical fiber and light transmitting or receiving equipment.

2. Background of the Invention

Incorporated by reference herein is U.S. Pat. No. 4,787,704 to Knecht et al and U.S. Pat. No. 4,755,018 issued to Heng et al. Knecht et al disclose an optical fiber splice in which inner bodies, all having resilient surfaces thereon, compress optical fibers. As described, it is necessary to perform a crimping operation or use an adhesive to render the splice permanent.

Heng, et al disclose a connector in which radial compression is supplied by rotation of two external locking rings having cam shaped inner surfaces.

BRIEF SUMMARY OF THE INVENTION

The improved fiber optic connector features a transparent housing having first and second slots therein. The housing interior carries a bottom member having first and second ribs therein which protrude through the first and second slots, and the bottom member also has a groove opposite the ribs for carrying first and second glass rods, the glass rods being coated with a resilient material. A transparent top is inserted over the rods; the top has no resilient coating. First and second locking rings are placed over the first and second ribs, respectively. Each locking ring has a cam shaped inner surface whereby rotation of the locking rings relative to the ribs radially compresses the ribs, thereby centering optical fibers held within the connector between the coated rods and the transparent top member. Another feature is that the locking rings have successive first, second, and third inner diameters, where the third inner diameter is less than the first inner diameter and the second inner diameter is less than the third inner diameter; this enables the craftsperson to rotate the locking rings relative to the ribs to the first inner diameter position, called the open position, which allows insertion of optical fibers; rotation of the locking rings to the second inner diameter area produces inward radial compression on the ribs, thereby centering the optical fibers; and rotation to the third position gives the connector a stable closed position, which is not likely to be disturbed unless rotational torque is deliberately applied to the locking rings to reopen the connector.

Another interesting feature of this connector is produced due to the first and second rods having a resilient coating thereon and the top having no resilient coating; when the connector is closed, optical fibers carried therein are compressed into the resilient material coating the first and second rods. The normal force thereby supplied gives the connector stability against longitudinal tensional forces placed on the optical fiber; this resistance to tension has been found to continue even when the locking rings are moved back into an open position, thereby indicating some surface bonding between the optical fibers and the resilient material coating the first and second rods. Testing indicates an increase in attenuation of no more than 0.03 dB when subjected to one pound tension for a second, even after the locking rings have been released.

The end portions of the connector also contain features of interest. Placed at each end is a cap shaped grommet having a hollow therein for insertion of a coated optical fiber. Manufacturers of fiber optical cable often place coatings on the fibers, the coating thickness depending upon the intended use of the optical fiber. Therefore, it may be necessary to place in a single connector optical fibers having coatings of various thickness. Two frequently occurring coating thicknesses are 250 and 900 microns. Therefore, the grommets have an inner diameter just sufficient to allow insertion of a 900 micron coated optical fiber. Optional outer lead-ins which have an external diameter of around 900 microns and an inner diameter to accommodate a 250 micron optical fiber may be inserted into the grommets. Thus, regardless of which type coated optical fiber is used, the optical fiber coating will only just fit within the space provided. End nuts are further provided. When the end nuts are tightened by means of threads provided on the housing, pressure is placed upon the grommets, causing them to tightly press against the end nuts, housing, and either the fiber coating or the optional outer lead-ins, rendering an end surface giving substantial protection against the ingress of moisture. Washers are further provided around the locking rings to give additional protection against moisture ingress.

DETAILED DESCRIPTION OF PREFERRED EMBODIMENT

Figure 1:
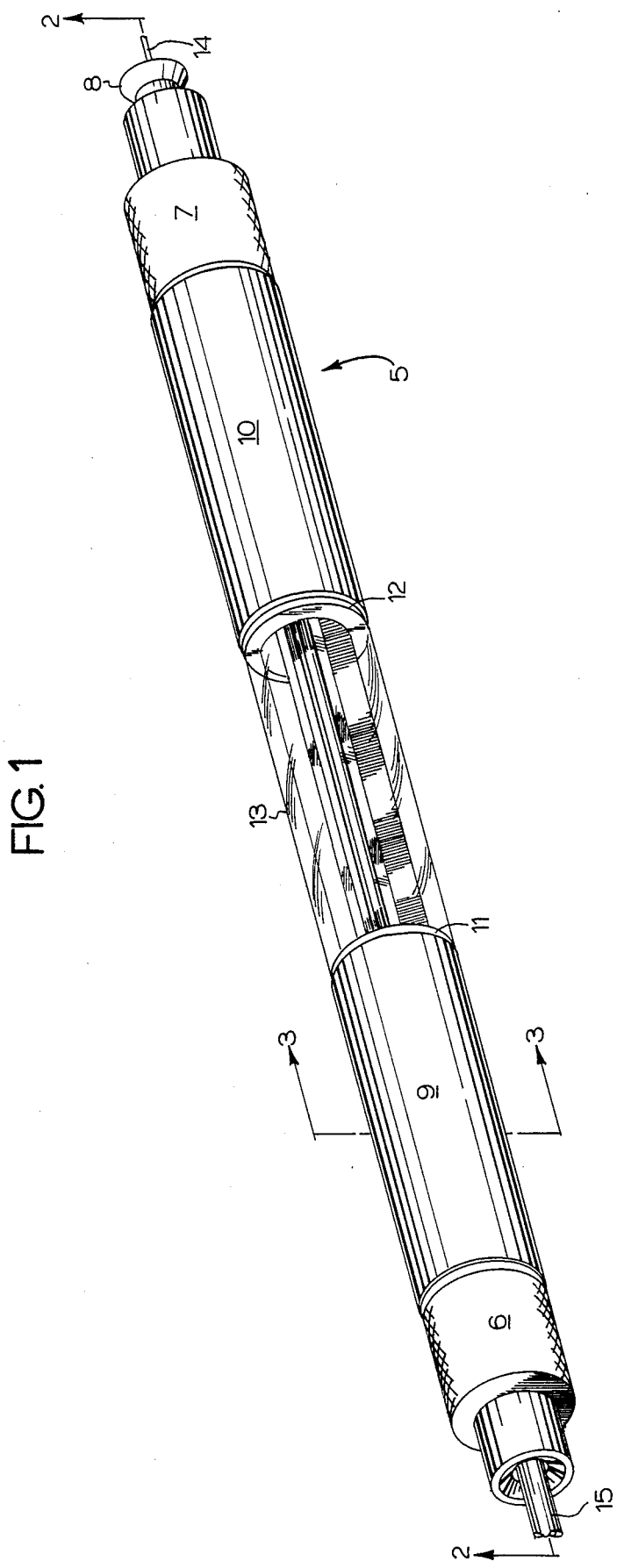
FIG. 1 is a perspective view of the disclosed connector.
Figure 2:
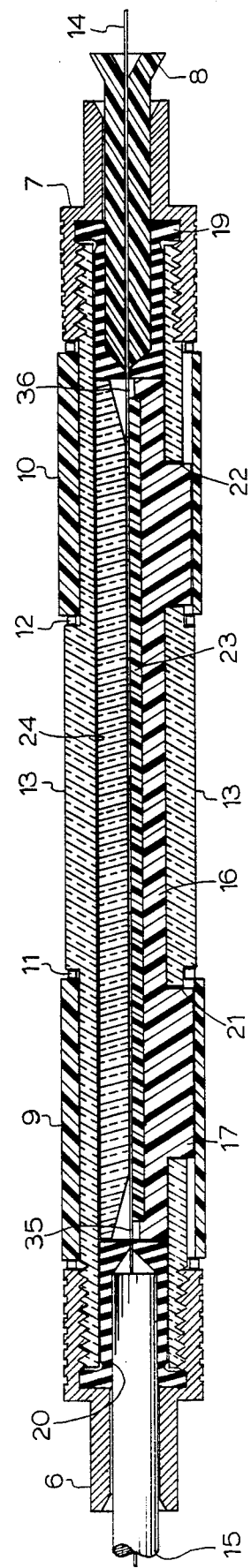
FIG. 2 is a longitudinal sectional view along lines 2—2 of FIG. 1.

The figures show a connector 5 connecting coated optical fibers 15, 14 end to end. Due to the differences in coating thickness, coated optical fiber 15 has an outer diameter of 900 microns, while coated optical fiber 14 has an outer diameter of 250 microns. Due to the smaller size of coated optical fiber 14, optical fiber 14 first proceeds through outer lead-in 8, which has an outer diameter of approximately 900 microns and an inner diameter slightly larger than 250 microns to allow coated optical fiber 14 to pass therethrough.

After the coating is stripped from optical fiber end portions 35, 36 to be connected, they enter into the area enclosed by transparent housing 13. Transparent housing 13 has slots 22, 21, therein. These slots are adapted to provie passages for rib 17 and another rib as shown affixed to bottom member 16 carried within housing 13. Bottom member 16 also has a slot therein opposite rib 17 for carrying glass rods 30, 31 which are coated with polyester urethane resilient material 18, 23. The preferred polyester urethane material at this time is PS27-204 made by Morton Thiocol with these characteristics: Hardness 90–95 A, specific gravity 1.19, tensile strength 10,000 psi, modulus of elongation at 100% of 1600 psi; elongation 400%, tear strength 450 psi; compression set 25–40%; and abrasion resistance 10 mg/100 cycle loss. These coated rods lie side by side within the slot provided in bottom member 16. Placed over rods 30, 31 is transparent top member 24, which has a flat surface adjacent to rods 30, 31 having no resilient material thereon. After these internal members are placed within housing 13, optical fibers 35, 36 may be inserted between glass rods 30, 31 and top member 24 until they meet end to end.

Figure 3:
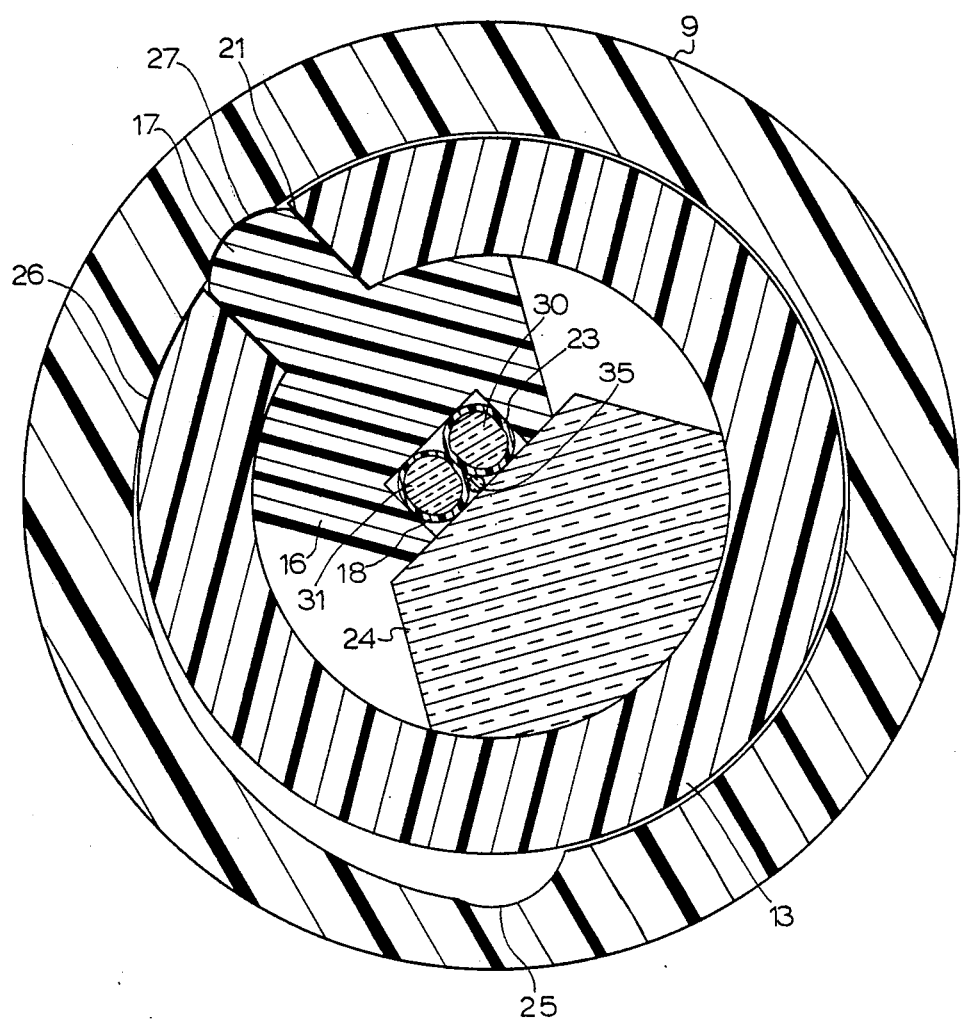
FIG. 3 is a cross-sectional view along lines 3—3 of FIG. 1.

The optical fibers 35, 36 now must be centered and given some degree of resistance to longitudinal tensional forces. Locking rings 9, 10 are placed around indentations provided in housing 13 abutting the ribs such as 17 of bottom member 16. As shown in FIG. 3, locking rings 9, 10 have an inner wall having in circumferential succession a first inner diameter 25, a second inner diameter 26, and a third inner diameter 27, third inner diameter 27 being smaller than first inner diameter 25 and second inner diameter 26 being smaller than third inner diameter 27. When the optical fibers 35, 36 are placed within the connector, the locking rings are rotated relative to the housing such that, for instance, rib 16 is adjacent to first inner diameter area 25, the open position. Rotation of first locking ring 9 to second inner diameter area 26 provides inward radial compression to rib 17 and bottom member 16, centering optical fiber 35. A slight indentation having third inner diameter 27 is provided to give the connector a stable closed position when rib 17 is adjacent to third inner diameter area 27. Second locking ring 10 is symmetric with locking ring 9 and operates in the same manner.

The connector further features cap shaped grommets 19, 20 having passages therein to receive an object having an outer diameter of approximately 900 microns, such as coated optical fiber 15 or outer lead-in 8. Housing 13 has outer threads therein to engage with inner threads on end nuts 6, 7. When end nuts 6, 7 are tightened, pressure is placed upon grommets 19, 20, which are made of a resilient material. The grommets then are forced to tightly grip either coated optical fiber 15 or end member 8, providing a substantial degree of protection against moisture ingress. Washers such as 11, 12 may also be used to provide further protection against moisture ingress by being placed between locking rings 9, 10 and housing 13 or end nuts 6, 7.

To assemble the connector, a tool such as tweezers are necessary to insert or remove the small members contained within the housing 13. For instance, when assembling the connector, bottom member 16 is inserted first, so that it ribs such as 17 protrude through slots 21, 22. Bottom member 16 contains coated glass rods 30, 31 before insertion. top member 24 may then be inserted. Grommets 19, 20 are inserted within end nuts 6, 7. The coating is stripped off optical fibers 35, 36 over a length such that the optical fiber coating will not be present in the area of coated glass rods 30, 31. Outer lead-in 8 is placed around smaller coated optical fiber 14 and the optical fibers 35, 36 are inserted. The point when optical fibers 35, 36 meet may be determined both by feel and visually through transparent housing 13 and top member 24. Locking nuts 9, 10 are moved to their closed positions and end nuts 6, 7 are tightened to complete and seal the connection. A complete connection is thereby made without the use of adhesives. The connector may be disassembled by proceeding in a fashion opposite to that required to assemble the connector.

The washers 11, 12 may be common O rings. End nuts 6, 7 may be machined from brass or other metals or materials of sufficient hardness. The remaining components, other than glass rods 30, 31, may be molded plastic. It is believed that the connector thus described may be conveniently used by the craftsperson without the use of adhesives which can be somewhat messy and take time to cure. Avoiding the use of adhesives also allows the use of the device as a rematable connector instead of a permanent splice, to allow for future refiguration of the transmission system.

This connector exhibits an attenuation increase of less than 0.2 dB after being subjected to ultrasonic vibration for thirty minutes while submerged in water and temperature cycled from −40° C. to +80° C.

It will be understood that connectors having one optional fiber and a light emitting or receiving device are also easily constructed having the advantages described, and such devices are considered to be within the scope of the invention as described by the claims herein.

What is claimed is:

1. A connector for positioning an optical fiber, comprising:
   (a) a housing having an inner surface therein delimiting a first space, said housing having a first slot;
   (b) a first body carried by the housing within the first space, the first body having a first rib extending through the first slot; and,
   (c) a first locking ring carried by the housing and surrounding the housing, the first locking ring having an inner wall having in circumferential succession a first inner diameter, a second inner diameter, and a third inner diameter, the third inner diameter being smaller than the first inner diameter and the second inner diameter being smaller than the third inner diameter.

2. A connector for positioning an optical fiber, comprising:
   (a) a housing having an inner surface therein delimiting a first space;
   (b) first and second centering members disposed in the first space, the first centering member having a first surface for engaging an optical fiber and the second centering member having a second surface for engaging an optical fiber, the first surface having a resilient coating thereon and the second surface not having a resilient coating thereon; and,
   (c) compression means for applying inward radial compression to the first and second centering members.

3. A connector for positioning an optical fiber as recited in claim 2, the compression means comprising a ring having a cam shaped inner surface carried on the housing.

4. A connector for positioning an optical fiber as recited in claim 2, wherein the resilient coating has an abrasion resistance of not more than 10 mg/1000 cycle loss and a compression set of 25–40%.

* * * * *

UNITED STATES PATENT AND TRADEMARK OFFICE
CERTIFICATE OF CORRECTION

PATENT NO. : 4,923,274

DATED : May 8, 1990

INVENTOR(S) : David L. Dean

It is certified that error appears in the above-identified patent and that said Letters Patent is hereby corrected as shown below:

Column 2, line 62, delete "100" and substitute therefor -- 1000 --.

Signed and Sealed this

Twenty-seventh Day of August, 1991

Attest:

HARRY F. MANBECK, JR.

Attesting Officer

Commissioner of Patents and Trademarks